(12) United States Patent
Hashish et al.

(10) Patent No.: US 9,225,222 B2
(45) Date of Patent: Dec. 29, 2015

(54) MAGNETIC BEARING APPARATUS AND METHOD FOR VARYING SHAFT THRUST LOAD SUPPORT IN INDUCTION MOTORS AND OTHER ROTATING MACHINERY

(71) Applicant: Siemens Industry, Inc., Alpharetta, GA (US)

(72) Inventors: Emam Hashish, Cincinnati, OH (US); Nicholas G. Lang, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 197 days.

(21) Appl. No.: 13/654,577

(22) Filed: Oct. 18, 2012

(65) Prior Publication Data

US 2014/0111047 A1  Apr. 24, 2014

(51) Int. Cl.
*H02K 7/09* (2006.01)
*F16C 27/06* (2006.01)
*F16C 32/04* (2006.01)

(52) U.S. Cl.
CPC *H02K 7/09* (2013.01); *F16C 27/06* (2013.01); *F16C 32/0427* (2013.01); *F16C 32/0429* (2013.01); *H02K 2201/03* (2013.01); *H02K 2213/09* (2013.01)

(58) Field of Classification Search
None
See application file for complete search history.

(56) References Cited

U.S. PATENT DOCUMENTS

| | | | | |
|---|---|---|---|---|
| 3,860,300 | A | * | 1/1975 | Lyman ........................ 310/90.5 |
| 4,112,663 | A | * | 9/1978 | Chrtek et al. .................... 57/415 |
| 4,726,640 | A | * | 2/1988 | Iwama et al. ............. 359/200.7 |
| 4,833,873 | A | * | 5/1989 | Kobayashi et al. ............. 57/100 |
| 4,876,847 | A | * | 10/1989 | Obata et al. ..................... 57/100 |
| 4,886,991 | A | * | 12/1989 | Braun ........................... 310/212 |
| 5,161,361 | A | * | 11/1992 | Talley et al. .................... 57/264 |
| 5,396,757 | A | * | 3/1995 | Kobayashi et al. ............. 57/100 |
| 5,537,810 | A | * | 7/1996 | Paweletz ......................... 57/406 |
| 6,111,333 | A | * | 8/2000 | Takahashi et al. ........... 310/90.5 |
| 6,124,658 | A | * | 9/2000 | Coenen ....................... 310/90.5 |
| 6,806,605 | B1 | * | 10/2004 | Gabrys ....................... 310/90.5 |
| 2011/0291507 | A1 | * | 12/2011 | Post ............................. 310/90.5 |

* cited by examiner

*Primary Examiner* — Tran Nguyen

(57) ABSTRACT

A permanent magnet bearing supports part of thrust loads of a vertical shaft induction motor, or the thrust loads of other types of rotation machinery regardless of shaft rotational axis orientation, in parallel with a lubricated mechanical bearing. The permanent magnet has a stationary magnet portion coupled to a bearing bracket and a rotating portion adapted for coupling to a rotor shaft. The permanent magnet bearing exerts a directional magnetic force that generates a preload support force on the rotor shaft that is selectively varied by varying air gap between the stationary and rotating magnet portions. Air gap between the magnet portions is varied with an air gap adjustment mechanism. The gap adjustment mechanism may be coupled to a control system that in some embodiments causes the permanent magnet bearing to vary the air gap based on external load applied on the motor.

13 Claims, 6 Drawing Sheets

MAGNETIC BEARING APPARATUS AND METHOD FOR VARYING SHAFT THRUST LOAD SUPPORT IN INDUCTION MOTORS AND OTHER ROTATING MACHINERY

CROSS-REFERENCE TO RELATED APPLICATIONS

This application incorporates by reference in their entirety United States utility patent applications entitled "PASSIVE MAGNETIC BEARINGS FOR ROTATING EQUIPMENT INCLUDING INDUCTION MACHINES" filed Aug. 30, 2011 and assigned U.S. patent application Ser. No. 13/221,074 (U.S. patent application number 2013/0049507 A1), and "RADIAL MAGNETIC VIBRATION DAMPING APPARATUS, BEARING SUPPORT ASSEMBLIES, AND OPERATIONAL METHODS" filed Oct. 18, 2012 and assigned U.S. patent application Ser. No. 13/654,561 (U.S. Pat. No. 9,140,297 B2).

BACKGROUND OF THE INVENTION

1. Field of the Invention

The invention relates to induction machine and other rotating machinery thrust bearings. More particularly the present invention relates to methods and apparatus for selectively varying shaft preload bias force on motor lubricated mechanical thrust bearings that support the shafts, by selectively varying air gap between stationary and rotating magnet portions of permanent magnet bearings that provide shaft preload. Exemplary embodiments of the present invention are directed to selectively varying shaft preload bias force on upper thrust bearings in vertical shaft induction motors with variable air gap permanent magnets.

2. Description of the Prior Art

Known rotating machinery, including vertical shaft motors, utilizes lubricated mechanical bearings to support, a rotating shaft and rotor. The rotating shaft vertical axial and radial loads are often supported by one or more mechanical bearings mounted within a bearing bracket. In vertical shaft induction motors the bearing bracket is in turn located in the upper portion of the vertically oriented motor housing. In such motors a lower mechanical bearing at the bottom of the motor housing supports shaft radial loads. Exemplary lubricated mechanical bearing types utilized in rotating machinery, including vertical shaft induction motors, include rolling element anti-friction bearings (e.g., spherical-type) wherein the rolling elements are lubricated by a non-pressurized boundary film layer between the element and its associated bearing race, hydrodynamic journal or thrust bearings that generate self-supporting pressurized lubricant films and hydrostatic bearings that employ externally pressurized lubricant. Some axial thrust fluid bearings consume significant power as they support the rotor vertical/axial thrust loads. Those loads generate heat in the bearing lubricant and necessitate active cooling, which complicates equipment design and maintenance. Some applications are not suitable for bearing lubricant cooling equipment. Under such circumstances motor rotational speed and/or load have to be kept sufficiently low to avoid need for bearing cooling equipment, or makes none applicable at times. These operational challenges for vertical shaft induction motors are generally applicable to other types of rotating machinery thrust bearing applications, regardless of the rotating shaft orientation (i.e., vertical horizontal or any other angle axis of rotation).

A need exists for a method and apparatus that passively and selectively apply desired variable preload force on lubricated mechanical bearings in rotating machinery, including vertical shaft motors, without the need for bearing lubricant cooling equipment and energy consumption associated with the cooling equipment.

Another need exists for a method and apparatus that passively and selectively apply desired variable preload force on lubricated mechanical bearings in rotating machinery including vertical shaft induction motors, to decrease the proportion of the shaft load that must be supported by the mechanical bearings. In this manner the mechanical bearing service life may be prolonged, higher loads may be supported by the existing bearing size, and/or smaller bearings can be substituted for the existing bearing size during retrofitting service.

An additional need exists for a method and apparatus that passively and selectively apply desired variable preload force on rotating machinery lubricated mechanical bearings, including vertical shaft motor upper lubricated mechanical bearings, that can be added to existing machinery designs during initial manufacture or retrofitted to existing machines during a servicing/maintenance period.

Yet another need exists in the art for a method and apparatus that passively and selectively apply desired variable thrust preload force on rotating machinery lubricated mechanical bearings, including vertical shaft motor upper lubricated mechanical bearings, in response to changes in shaft load.

SUMMARY OF THE INVENTION

Accordingly, an object of the invention is to create a method and apparatus that passively and selectively applies desired variable preload force on vertical shaft motor upper lubricated mechanical bearings, or thrust bearings of other types of rotation machinery thrust loads regardless of the rotational axis orientation, without the need for bearing lubricant cooling equipment and energy consumption associated the cooling equipment with active magnetic bearings.

Another object of the invention is to create a method and apparatus that passively and selectively applies desired variable preload force on vertical shaft motor upper lubricated mechanical bearings, or thrust bearings of other types of rotation machinery thrust loads regardless of the rotational axis orientation, to decrease the proportion of the shaft load that must be supported by the mechanical bearings. The present invention meets this object, so that mechanical bearing service life may be prolonged, higher loads may be supported by the existing bearing size, and/or smaller bearings can be substituted for the existing bearing size during retrofitting service.

An additional object of the present invention is to create a method and apparatus that passively and selectively applies desired variable preload force on vertical shaft motor upper lubricated mechanical bearings, or thrust bearings of other types of rotation machinery thrust loads regardless of the rotational axis orientation, that can be added to existing motor designs or other rotating machinery during manufacture or retrofitted to existing machinery during a servicing/maintenance procedures.

Yet another object of the present invention is to create a method and apparatus that passively and selectively applies desired variable preload force on vertical shaft motor upper lubricated mechanical bearings, or thrust bearings of other types of rotation machinery thrust loads regardless of the rotational axis orientation, in response to changes in shaft load.

These and other objects are achieved in accordance with the present invention by adding a permanent magnet bearing to a vertical motor upper bearing assembly, that may be coupled to the upper bearing bracket. The permanent magnet bearing can also be added to other types of rotating machinery thrust bearings, regardless of rotational axis orientation. The permanent magnet bearing supports part of the rotating shaft and rotor vertical thrust loads, in parallel with the lubricated mechanical bearing. The permanent magnet has a stationary magnet portion coupled to the rotating machine housing directly or indirectly through a bearing bracket, as well as a rotating portion adapted for coupling to a rotor shaft. The permanent magnet bearing exerts a directional magnetic force that generates a preload support force on the rotor shaft that is selectively varied by varying air gap between the stationary and rotating magnet portions. Air gap between the magnet portions may be selectively with an air gap adjustment mechanism. In some embodiments of the present invention the air gap is passively varied by an adjustment mechanism comprising a shim, shim stack or spring coupled to the permanent magnet bearing that translates the magnet portions relative to each other based on spring load. In other embodiments the gap adjustment mechanism is actively varied by a hydraulic mechanism coupled to the permanent magnet bearing that translates the magnet portions relative to each other to vary the air gap. In other embodiments the gap adjustment mechanism is coupled to a control system that causes the gap adjustment to vary the air gap. The control system in some embodiments causes the permanent magnet bearing to vary the air gap based on external load applied to the rotating machine or other sensed parameters related to applied load.

Embodiments of the present invention feature a bearing apparatus for a rotating machine, having an bearing bracket adapted for coupling to a rotating machine housing, such as an induction motor housing and for supporting a rotating shaft therein. At least one lubricated shaft support mechanical bearing is coupled to the bearing bracket, adapted for rotatively capturing a shaft therein, and supporting shaft axial and radial loads. A permanent magnet bearing is coupled to the housing and/or bearing bracket, having a stationary magnet portion coupled to either the housing or bearing bracket and a rotating portion adapted for coupling to a shaft. The permanent magnet bearing exerts a directional magnetic force that generates an axial thrust preload support force on the shaft that is selectively varied by varying air gap between the stationary and rotating magnet portions.

Other embodiments of the present invention feature a vertical shaft induction motor apparatus, comprising a vertically-oriented housing, with a vertically oriented motor shaft rotatively mounted in the housing. The motor also includes a bearing apparatus, having an upper bearing bracket coupled to an upper portion of the housing, for supporting the motor shaft. A lubricated motor shaft support mechanical bearing is coupled to the upper bearing bracket, rotatively capturing the motor shaft therein, and supporting the shaft axial and radial loads. A permanent magnet bearing is coupled to the housing directly or through the upper bearing bracket, having a stationary magnet portion coupled to the housing and/or bearing bracket and a rotating portion coupled to the motor shaft. The permanent magnet bearing exerts a directional magnetic force that generates a preload support force on the rotor shaft that is selectively varied by varying air gap between the stationary and rotating magnet portions. The motor also has a lower bearing coupled to a lower portion of the housing and rotatively coupled to the motor shaft, for supporting the shaft.

Other embodiments of the present invention feature a method for varying axial preload support force on a lubricated mechanical thrust bearing of a rotating machine, such as a vertical shaft induction motor. The method is practiced by supporting with a permanent magnet bearing at least a portion of axial thrust loads imparted on a lubricated mechanical thrust bearing. The mechanical thrust bearing supports a rotating shaft. The permanent magnet bearing has a stationary magnet portion coupled to a housing of the rotating machine and a rotating portion coupled to the shaft. The permanent magnet bearing exerts a directional magnetic force that generates an axial thrust preload support force on the shaft that is selectively varied by varying air gap between the stationary and rotating magnet portions. When practicing the method of the present invention the permanent magnet bearing air gap is selectively varied in order to vary the preload support force generated by the permanent magnet. In other method embodiments the air gap is dynamically varied based on external load applied on the motor.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in rotating machinery bearings by adding a permanent magnet bearing that supports part of thrust loads of a vertical shaft induction motor, or the thrust loads of other types of rotation machinery regardless of shaft rotational axis orientation, in parallel with a lubricated mechanical bearing. The permanent magnet has a stationary magnet portion coupled to a bearing bracket and a rotating portion adapted for coupling to a rotating shaft. The permanent magnet bearing exerts a directional magnetic force that generates a preload support axial or thrust force on the shaft that is selectively varied by varying air gap between the stationary and rotating magnet portions. Air gap between the magnet portions is varied with an air gap adjustment mechanism. The gap adjustment mechanism may be coupled to a control system that in some embodiments causes the permanent magnet bearing to vary the air gap based on external load applied on the motor.

Figure 1:
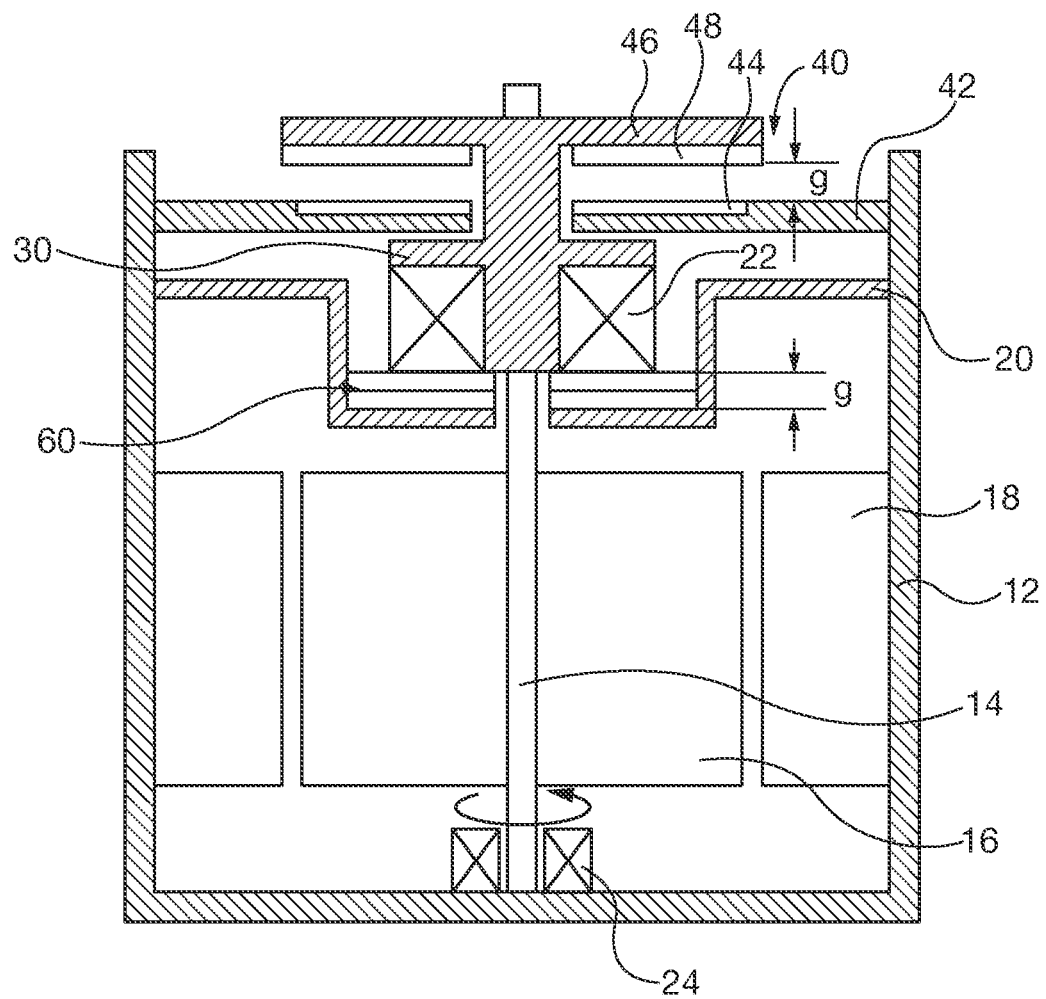
FIG. 1 shows an elevational cross sectional view of an embodiment of the present invention in a vertical shaft induction motor rotating machine.

FIG. 1 shows a rotating machine incorporating an embodiment of the present invention. Vertical shaft motor 10 has a housing 12 with a rotating shaft 14 that supports a rotor core 16. The rotor core 16 is surrounded by and electromagnetically coupled to stator 18. Upper bearing support bracket 20 is affixed to the housing 12 and supports lubricated mechanical bearing 22. The mechanical bearing 22 supports radial and axial thrust loads imparted on the shaft 14 by electrodynamic interaction between the rotor 14/stator 18 as well as external loads applied to the shaft. A lower mechanical bearing 24 supports at least radial loads imparted on the shaft 14. Bearing mounting sleeve 30 is coupled to the shaft 14 and the mechanical bearing 22, so that shaft loads are transferred to from the shaft to the bearing.

Figure 2:
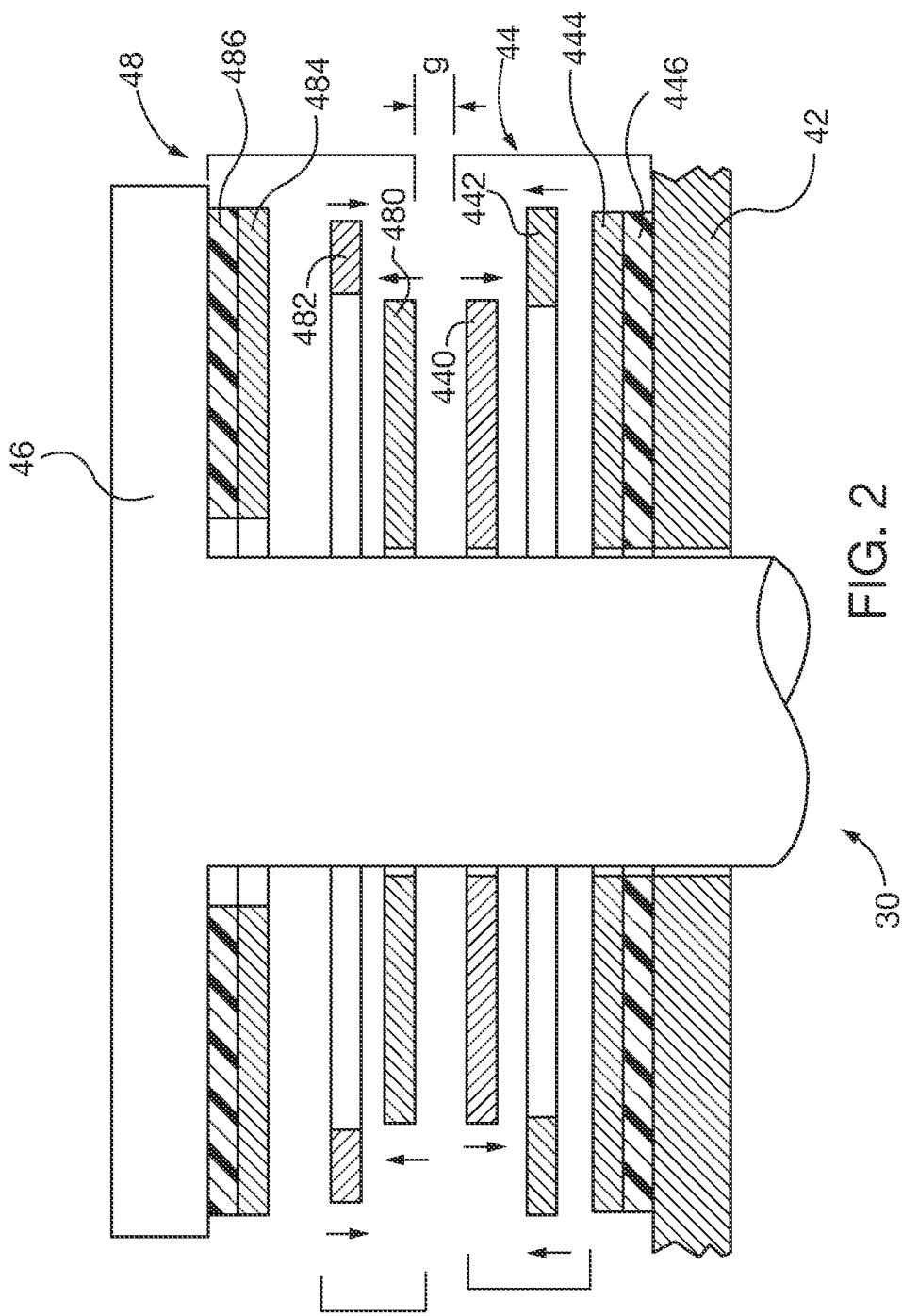
FIG. 2 shows a partial detailed elevational cross sectional view of a magnetic bearing embodiment of the present invention.
Figure 3:
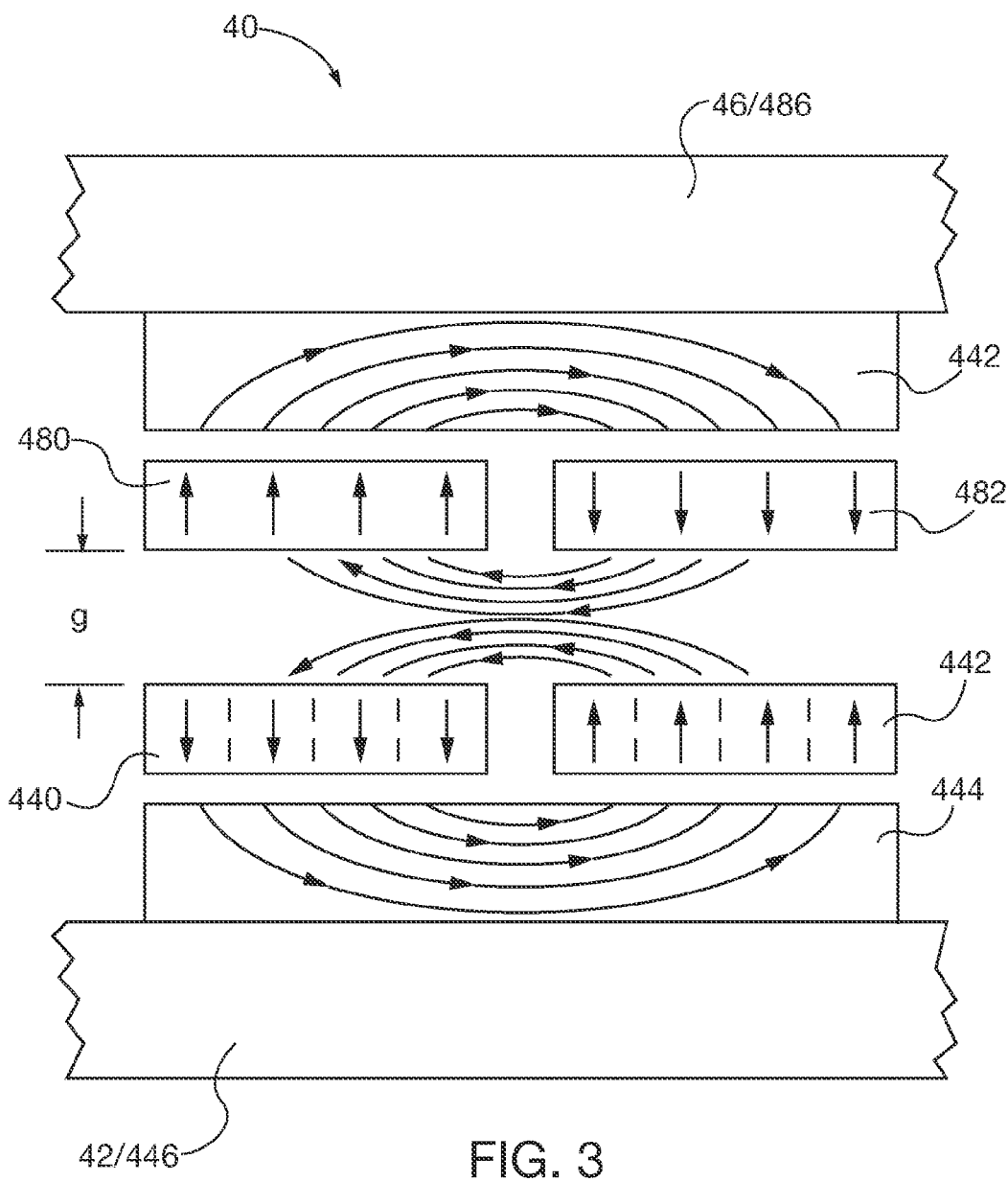
FIG. 3 shows a schematic elevational view of magnet flux lines of the magnetic bearing embodiment of FIG. 2.

Referring to FIGS. 1-3, the embodiment of the bearing apparatus of the present invention includes permanent magnet bearing 40 that supports part of thrust axial thrust loads imparted on the shaft 14 in parallel with a lubricated mechanical bearing 22. The permanent magnet bearing 40 has a stationary magnet portion 44 coupled to a permanent magnet support 42, which is either directly coupled to the housing 12 as shown schematically, or incorporated into the bearing bracket 20 structure, and ultimately structurally supported by the housing 12. The permanent magnet bearing 40 also has a rotating magnet portion 48 that is coupled to the shaft 14 by the rotating magnet support 46, which forms part of the bearing mounting sleeve 30. The permanent magnet bearing 40 exerts a directional magnetic force that generates a preload support axial or thrust force on the shaft 14 that is selectively varied by varying air gap "g" between the stationary and rotating magnet portions 44, 48. In the embodiment of FIGS. 1-3 the magnet bearing 40 air gap g is varied by changing the thickness of the shim stack 60 between the bearing bracket 20 and the mechanical bearing 22. Adding additional shim 60 thickness increases the air gap 60, reducing the permanent magnet bearing 40 preload. Conversely, decreasing the shim stack 60 thickness increases the magnetic bearing 40 preload. The permanent magnet bearing 40 may be incorporated into new manufacture rotating machines or retrofitted to existing machines. It should be noted that retrofitting of an existing machine with the permanent magnet bearing 40 of the present invention constitutes construction of a new machine that incorporates the present invention, rather than a mere repair of the old machine structure.

Structural details of an embodiment of the permanent magnet bearing 40 are shown in FIG. 2. The Stationary magnet portion 44 includes a two-dimensional array of radially concentrically nested annular permanent magnets 440, 442 having opposite pole directions, shown schematically by the arrows. The magnetic material may comprise ferrites or rare earth magnets, such as neodymium (NdFeR) or samarium-cobalt (SmCo). Additional stacks of nested annular magnets may be stacked on the magnets 440, 442 to form a three-dimensional magnet array, in order to increase magnetic field strength. A laminated steel ferromagnetic plate 444 improves and shapes the magnetic flux path of the stationary magnet portion 44. An elastomeric pad 446 may be interposed between the stationary magnet portion 44 and the stationary magnet support 42 for vibrational damping. Other types of vibrational dampers may be substituted for the elastomeric pad 446, or alternatively the damping function may be incorporated directly into the stationary magnet support 42 structure or material forming the structure.

Similarly, as shown in FIG. 2, the rotating magnet portion 48 comprises a pair of radially concentrically nested annular permanent magnets 480, 482 having opposite pole directions, shown schematically by the arrows. The magnetic material may comprise ferrites or rare earth magnets, such as neodymium (NdFeR) or samarium-cobalt (SmCo). Additional stacks of nested annular magnets may be stacked on the magnets 480, 482 to increase magnetic field strength, by forming a three dimensional magnet array. A laminated steel ferromagnetic plate 484 improves and shapes the magnetic flux path of the rotating magnet portion 48. An elastomeric pad 486 may be interposed between the rotating magnet portion 48 and its associated support 46 for vibrational damping. Other types of vibrational dampers may be substituted for the elastomeric pad 486, or alternatively the damping function may be incorporated directly into the rotating magnet support 46 structure or material forming the structure.

Figure 4:
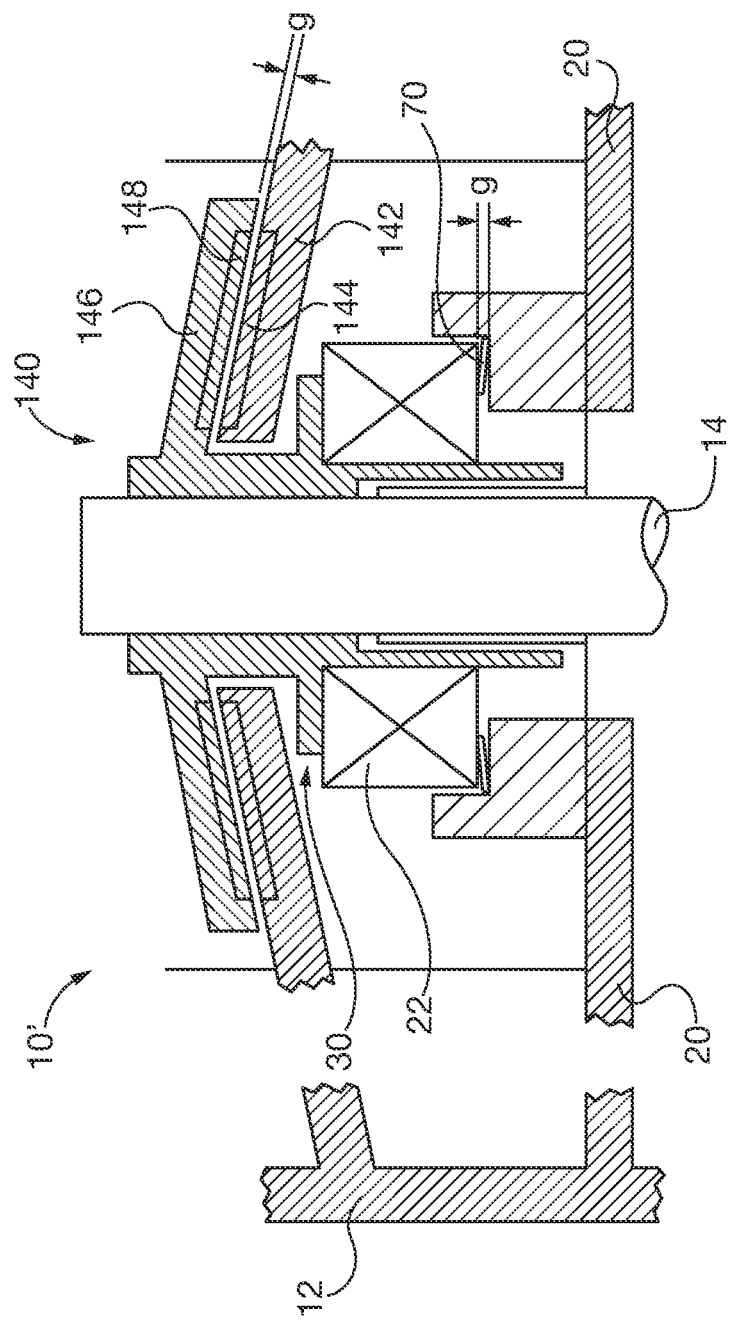
FIG. 4 shows a partial elevational cross sectional view of another embodiment of a magnetic bearing of the present invention in a vertical shaft induction motor rotating machine.

Magnetic flux generated by the embodiment of permanent magnet bearing 40 is shown schematically in FIG. 3. Other permanent magnet bearing 40 geometries and field orientations may be substituted for those shown in FIGS. 1-3. Referring to FIG. 4, vertical shaft induction motor rotating machine 10' permanent magnet bearing 140 has a radially sloped cross sectional profile that imparts both axial and radial preload on the shaft 14. There the respective stationary magnet support 142 and rotating magnet support 146 have a generally conical cross section. Other components shown in FIG. 4 have substantially the same function as those shown in FIG. 1, though they have different dimensions. For example the magnet arrays forming respective stationary and rotating magnet portions 144, 148 may have different cross sections than the magnet arrays in FIGS. 2 and 3. Air gap g in the embodiment of FIG. 4 is selectively varied by substituting different strength springs 70 between the bearing bracket 20 and bearings 22. Conical leaf springs 70 are shown in FIG. 4, but other types of springs may be used, including helical springs.

Figure 5:
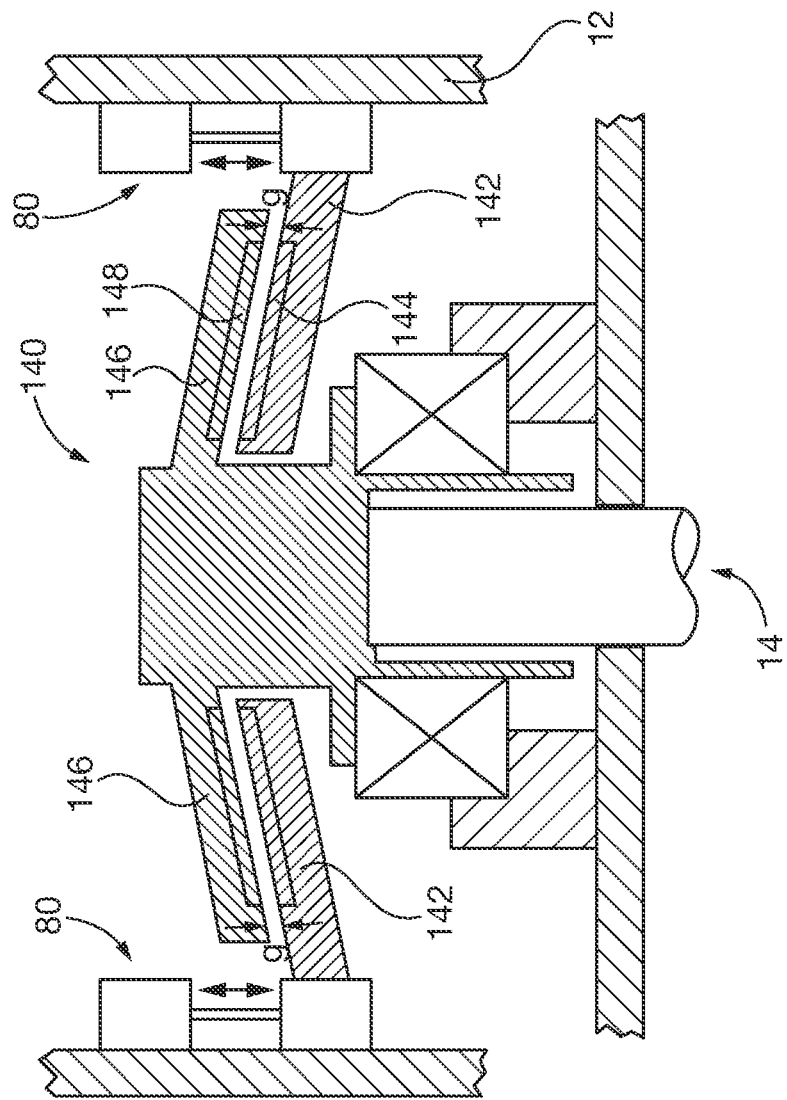
FIG. 5 shows a partial elevational cross sectional view of yet another embodiment of a magnetic bearing of the present invention in a vertical shaft induction motor rotating machine.
Figure 6:
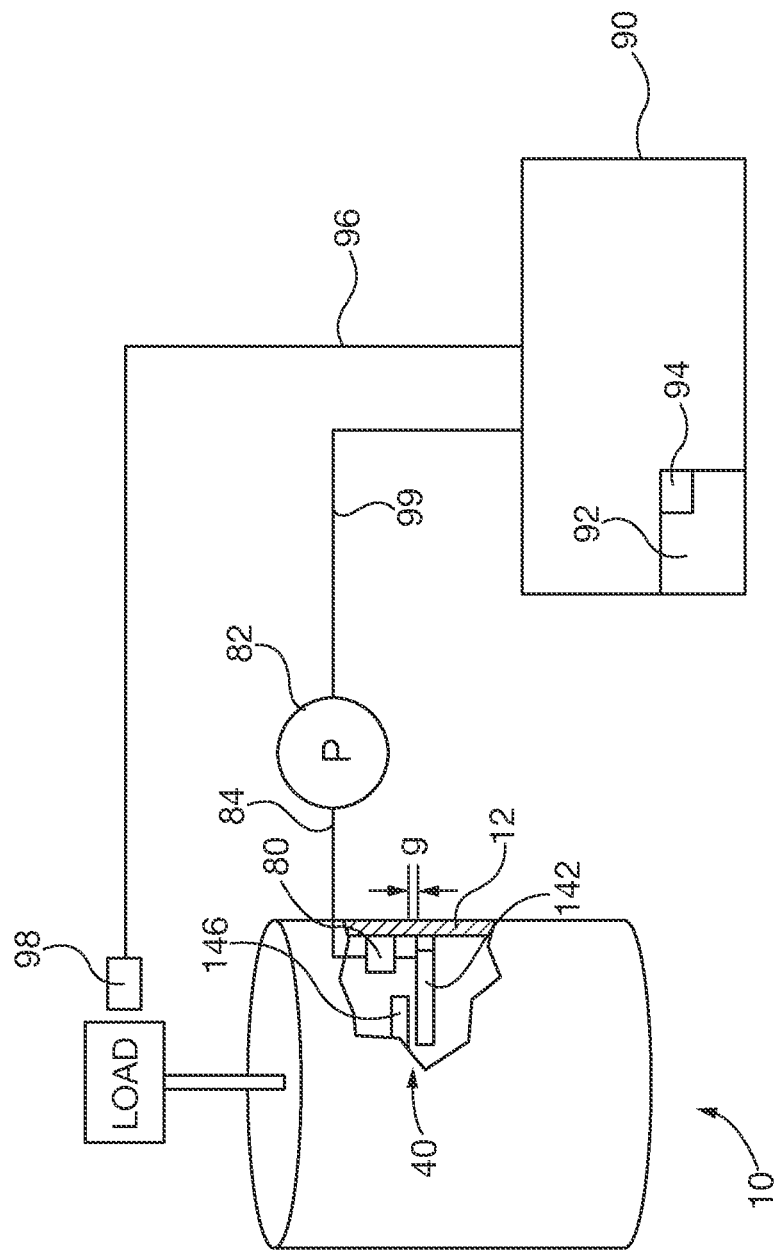
FIG. 6 is a schematic block diagram of the magnetic bearing embodiment of FIG. 5 showing a control system for selectively varying magnetic gap within the magnetic bearing.

FIG. 5 shows another embodiment of magnetic bearing 140 air gap adjustment mechanisms: a hydraulic cylinder 80 that translates the stationary magnet support 142. Other air gap adjustment mechanisms may provide the translation function provided by the hydraulic cylinder 80, including manual screw adjustment mechanisms, pneumatic mechanisms and servo-driven mechanisms. Alternatively, as in all magnetic bearing air gap adjustment methods and apparatus described herein, the rotating magnet may be translated relative to the stationary magnet. The hydraulic cylinder 80 air gap adjustment mechanism facilitates "active" air gap g adjustment during the rotating machine operation, through use of a controller. As shown in FIG. 6, hydraulic cylinder 80 varies the magnetic bearing air gap g by varying pressure and/or flow rate of hydraulic fluid within the cylinder with pump 82. Pump 82 is controlled by controller 90, which in this embodiment actuates the pump via communication pathway 99. Controller 90 is a dedicated pump controller, alternatively a general purpose industrial controller or a general purpose computer. In the embodiment of FIG. 6 the controller 90 has a processor that executes instructions stored in accessible memory 94. Advantageously the controller 90 may actively vary the permanent magnet bearing 40 air gap g in response to changing loads imparted on the motor 10 or other rotating machine, and is coupled by communication pathway to a known load sensor 98 in a feedback loop. Load sensor 98 may directly sense or otherwise measure load imparted on the rotating machine 10, or it may indirectly sense the load, (e.g., by measuring current drawn by the motor 10 to drive the load and correlating the drawn current to the external load magnitude).

It is also to be understood that the exemplary controller 90 embodiment of the present invention shown herein may be implemented in various forms of hardware, software, firmware, special purpose processors, or a combination thereof. Preferably, the present invention is implemented in software as a program tangibly embodied on a program storage device.

The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures for the controller 90, pump 82 actuation and load sensor 98 are preferably implemented in software, the actual connections between the system components (or the process steps) may differ depending upon the manner in which the present invention is programmed. Specifically, any of the computers or devices may be interconnected using any existing or later-discovered networking technology and may also all be connected through a lager network system, such as a corporate network, metropolitan network or a global network, such as the internet.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant, to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A bearing apparatus for a rotating machine, comprising:
   a bearing bracket;
   at least one lubricated shaft support mechanical bearing coupled to the bearing bracket;
   a permanent magnet bearing having a stationary permanent magnet portion coupled to a permanent magnet support which is incorporated into the bearing bracket, and a rotating permanent magnet portion coupled to a rotating magnet support, the permanent magnet bearing exerting a directional magnetic force that generates an axial thrust preload support force on a rotating shaft that is selectively varied by varying air gap between the stationary and rotating permanent magnet portions; and
   an air gap adjustment mechanism for selectively varying the air gap between the stationary and rotating permanent magnet portions, for varying the magnetic force, the air gap adjustment mechanism having a control system coupled thereto for dynamically varying the air gap based on external load applied on the rotating machine, wherein the control system comprises a controller that varies the air gap in response to changing loads imparted on the rotating machine, and wherein the controller is coupled by communication pathway to a load sensor in a feedback loop.

2. The apparatus of claim 1, the air gap adjustment mechanism comprising a hydraulic mechanism coupled to the permanent magnet bearing that translates the permanent magnet portions relative to each other to vary the air gap.

3. The apparatus of claim 1, the permanent magnet bearing portions having a radially sloped cross sectional profile.

4. The apparatus of claim 1, the permanent magnet bearing comprising opposed arrays of a plurality of permanent magnets on the respective stationary and rotating portions.

5. The apparatus of claim 4, each of the plurality of arrays comprising a nested array of radially spaced permanent magnets.

6. The apparatus of claim 1, comprising a mechanical damper coupled to the permanent magnet bearing for damping vibrations induced in the bearing apparatus.

7. The apparatus of claim 6, the mechanical damper comprising an elastomeric layer between at least one of the permanent magnet portions and corresponding coupled structure.

8. The apparatus of claim 6, comprising the mechanical damper integrated into the corresponding coupled structure of at least one of the permanent magnet portions.

9. A vertical shaft induction motor apparatus, comprising:
   a vertically oriented housing;
   a vertically oriented motor shaft rotatively mounted in the housing;
   a bearing apparatus, having:
      an upper bearing bracket coupled to an upper portion of the housing, for supporting the motor shaft therein;
      a lubricated motor shaft support mechanical bearing coupled to the upper bearing bracket, rotatively capturing the motor shaft therein, and supporting the shaft axial and radial loads;
      a permanent magnet bearing coupled to the housing, having a stationary permanent magnet portion coupled to the housing and a rotating permanent magnet portion coupled to the motor shaft, the permanent magnet bearing exerting a directional magnetic force that generates a preload support force on the rotor shaft that is selectively varied by varying an air gap between the stationary and rotating permanent magnet portions;
      a lower bearing coupled to a lower portion of the housing and rotatively coupled to the motor shaft, for supporting the shaft; and
   an air gap adjustment mechanism for selectively varying the air gap between the stationary and rotating permanent magnet portions, for varying the magnetic force, the air gap adjustment mechanism having a control system coupled thereto for dynamically varying the air gap based on external load applied on the motor apparatus, wherein the control system comprises a controller that varies the air gap in response to changing loads imparted on the motor apparatus, and wherein the controller is coupled by communication pathway to a load sensor in a feedback loop.

10. The apparatus of claim 9, the permanent magnet bearing portions having a radially sloped cross sectional profile.

11. The apparatus of claim 9, the permanent magnet bearing comprising opposed arrays of a plurality of permanent magnets on the respective stationary and rotating portions.

12. The apparatus of claim 9, comprising a mechanical damper coupled to the permanent magnet bearing for damping vibrations induced in the bearing apparatus.

13. A method for varying axial preload support force on a lubricated mechanical thrust bearing of a rotating machine, comprising:

supporting with a permanent magnet bearing at least a portion of axial thrust loads imparted on a lubricated mechanical thrust bearing that supports a vertically oriented rotating shaft, the permanent magnet bearing having a stationary permanent magnet portion coupled to a vertically oriented housing of the rotating machine and a rotating permanent magnet portion coupled to the vertically oriented rotating shaft, the permanent magnet bearing exerting a directional magnetic force that generates an axial thrust preload support force on the vertically oriented rotating shaft that is selectively varied by varying an air gap between the stationary and rotating permanent magnet portions; and selectively varying the air gap to vary the preload support force generated by the permanent magnet bearing using an air gap adjustment mechanism having a control system coupled thereto for dynamically varying the air gap based on external load applied on the rotating machine, wherein the control system comprises a controller that varies the air gap in response to changing loads imparted on the rotating machine, and wherein the controller is coupled by communication pathway to a load sensor in a feedback loop.

* * * * *